(12) United States Patent
Robert et al.

(10) Patent No.: US 7,113,635 B2
(45) Date of Patent: Sep. 26, 2006

(54) PROCESS FOR MODELLING A 3D SCENE

(75) Inventors: Philippe Robert, Thorigne Fouillard (FR); Yannick Nicolas, Kerpert (FR)

(73) Assignee: Thomson Licensing, Boulogne-Billancourt (FR)

(*) Notice: Subject to any disclaimer, the term of this patent is extended or adjusted under 35 U.S.C. 154(b) by 700 days.

(21) Appl. No.: 10/396,182

(22) Filed: Mar. 25, 2003

(65) Prior Publication Data

US 2003/0179194 A1 Sep. 25, 2003

(30) Foreign Application Priority Data

Mar. 25, 2002 (FR) .................................. 02 03663

(51) Int. Cl.
*G06K 9/00* (2006.01)
*G06T 15/00* (2006.01)
(52) U.S. Cl. ....................................... 382/154; 345/419
(58) Field of Classification Search ................ 382/154, 382/284, 285; 345/419, 420; 356/12, 13
See application file for complete search history.

(56) References Cited

U.S. PATENT DOCUMENTS

| 5,821,943 A | * | 10/1998 | Shashua .................... 345/427 |
| 6,031,538 A | * | 2/2000 | Chupeau et al. ............ 345/419 |
| 6,198,486 B1 | | 3/2001 | Junkins et al. .............. 345/419 |

FOREIGN PATENT DOCUMENTS

| EP | 0526881 | 2/1993 |
| FR | 2798761 | 3/2001 |

OTHER PUBLICATIONS

Chang, et al "View generation for three dimensional scenes from video sequences", IEEE, pp. 584-598, 1997.*
Fitzgibbon et al., "Automatic 3D Model Construction for Turn-Table Sequences", Lecture Notes in Computer Science, Springer Verlag, New York, NY, US, Jun. 6, 1998, pp. 155-170.
Chen et al., "Adaptive Range Data Approximation by Constrained Surface Triangulation", Work. Conf. Modeling in Computer Graphics, Jul. 1993, pp. 95-113.
Search Report for French Appln. No. 0203663 dated Mar. 25, 2002.

* cited by examiner

*Primary Examiner*—Daniel Miriam
(74) *Attorney, Agent, or Firm*—Joseph J. Laks; Robert D. Shedd; Reitseng Lin

(57) ABSTRACT

A process for modeling a 3D scene is provided which comprises validating the model by determining a maximum permitted distortion (5) on a 2D synthesized image (4), generated by the approximation inherent in the model (2); calculating for a point I of a reference image (7) and on a set of synthesized images (4) representing the 3D point of the scene corresponding to this point I, of the minimum $(z_i - \Delta_{zi}^1)$ and maximum $(z_i + \Delta_{zi}^2)$ depth values of the depth $z_i$ of this point I corresponding to this maximum distortion, calculating a span around the depth $z_i$ of this point I, dependant on the minimum value of the error $\Delta_{zi}^2$ and on the minimum value of the error $\Delta_{zi}^1$ among the values calculated for the synthesized images of the set.

13 Claims, 4 Drawing Sheets

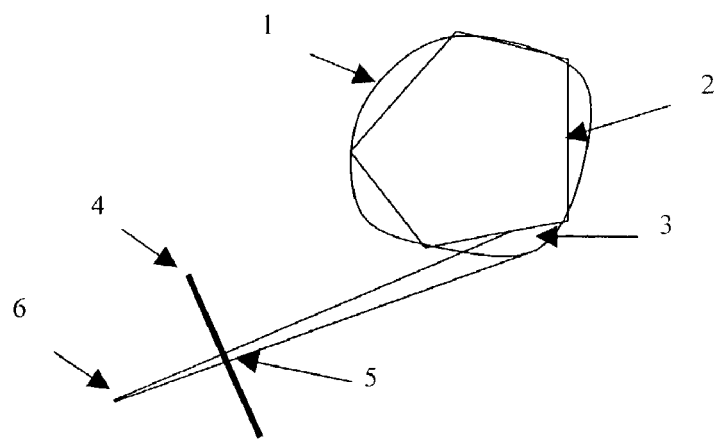
FIG.1
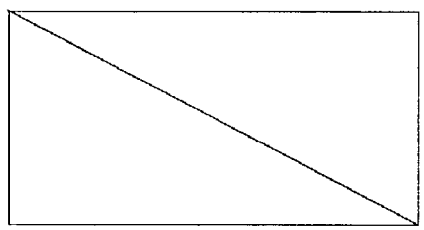
Fig.2a
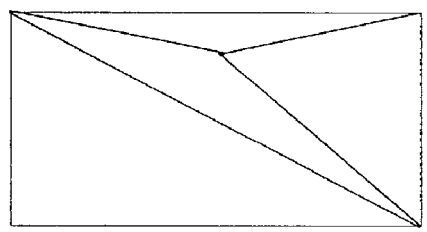
Fig.2b
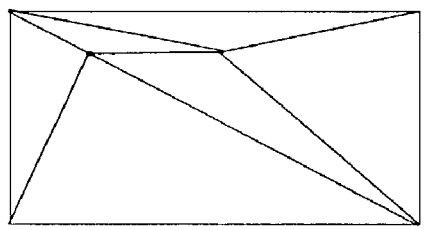
Fig.2c
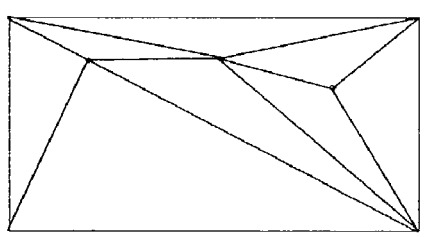
Fig.2d
FIG.2

PROCESS FOR MODELLING A 3D SCENE

FIELD OF THE INVENTION

The invention relates to a 3D scene modelling process and in particular to a process for modelling or for approximating a 3D object by a plane faceted 3D model allowing control of distortion in the synthesized images.

BACKGROUND OF THE INVENTION

The invention entails the construction of a 3D model of a scene on the basis of a reference image possessing a depth map.

FIG. 1 represents the surface of an object in 3D space referenced 1. An approximation of this object by facetization or triangulation yields a model whose surface is referenced 2. A synthesized image is obtained by projecting the model onto a plane 4 from a viewpoint 6. The error 3 due to the approximation of the surface of the object to that of the model is conveyed on the image by a 2D distortion referenced 5. The figure shows that the error due to the approximation of the surface of a 3D object by planes may be conveyed by an error in the position of its silhouette in the image and more generally by distortion of the shape of the object and of the textures in the image.

A conventional type of 3D model is the representation by 3D facets. Known methods exist for the facetization of depth maps. One scheme entails an iterative method based on an initial triangulation of the depth map. This method is for example mentioned in the article by Xin CHEN and Francis SCHMITT entitled "Adaptive interval data approximation by constrained surface triangulation", IFIP, Working conference on "Modelling in Computer Graphics", pages 95–113, Genova, Italy, July 93.

FIG. 2 illustrates a "coarse to fine" type incremental facetization of this kind. More precisely, FIGS. 2a to 2d correspond to successive iterations, the first iteration, FIG. 2a, consisting in the creation of two triangles from the rectangular image. It should be noted that the facetization can be limited to a region of the image, previously polygonized and triangulated so as to constitute the initial model.

At each iteration, an approximation error map is calculated: this error calculated at all the points of the image corresponds to the difference between the depth value of the pixel and its approximate value through facetization. On the basis of this error map, the most poorly approximated point is detected: it is the one having the largest error in terms of absolute value. This error is compared with a threshold: if the error is below the threshold, the facetization scheme is terminated; otherwise, the corresponding point is introduced as new vertex of facets, and the facet to which it belongs is composed into three new facets, as is represented in FIG. 2b or else into four new facets if the point is situated on an edge, as represented in FIG. 2c for the next iteration.

In the known methods of facetization through the most poorly approximated point, a single threshold is used for all the points of the image. As a result, the quality obtained is not homogeneous. Moreover, the modelling cost, the information required in defining the model or representation cost may be considerable, for minimum required quality.

An aim of the invention is to elevate the aforesaid drawbacks.

SUMMARY OF THE INVENTION

Its subject is a process for modelling a 3D scene defined on the basis of reference images associated with viewpoints and original depth maps, by calculation of approximate depth maps describing a model, characterized in that it comprises the following steps:

predetermination of a maximum permitted distortion on a 2D synthesized image, generated by the approximation inherent in the model, calculation, for a point I of a reference image and on the basis of a set of synthesized images representing the 3D point of the scene corresponding to this point I, of the minimum $(z_i-\Delta_{zi}^1)$ and maximum $(z_i+\Delta_{zi}^2)$ depth values of the depth $z_i$ of this point I corresponding to this maximum distortion, calculation of a span around the depth $z_i$ of this point I, dependant on the minimum value of the error $\Delta_{zi}^2$ and on the minimum value of the error $\Delta_{zi}^1$ among the values calculated for the synthesized images of the set, and in that it also comprises a step of validating an approximate depth map calculated by iteration, as a function of the depth of 3D points of the corresponding model which relate to points I of the reference image, depending on whether it does or does not belong to the span calculated for these points I.

According to a particular implementation, the process is characterized in that the calculation of the minimum and maximum values of the depth of a point I, for a synthesized image, is performed by utilizing the epipolar line corresponding to the point I in this synthesized image, to which are referred the distances corresponding to the maximum permitted distortion.

According to a particular implementation, the model being defined by a set of elementary regions, the 3D points whose depth is utilized for the validating step are the points of an elementary region of the model.

According to a particular implementation, an elementary region is a facet and in that the calculation by iteration is a facetization of the depth maps, the iteration comprising the creation of a new 3D facet vertex of the model or the deletion of a 3D facet vertex of the model depending on whether the process is of the "coarse to fine" or "fine to coarse" type.

According to a particular characteristic, the process, of "coarse to fine" type, is characterized in that the iteration comprises a calculation of the poorest approximate value from among the approximate values which relate to a facet and which are outside the spans, and in that the new vertex relates to the point corresponding to this value.

According to a particular characteristic, the set of synthesized images on which the calculation of the errors is performed corresponds to a sample representative of the set of viewpoints using the reference image. Another particular characteristic consists in that the set of synthesized images on which the calculation of the errors is performed is composed of images having a number greater than a threshold of 3D points in common with the reference image.

According to a particular implementation, the maximum permitted distortion is predetermined as a function of a characteristic of an image, for example a luminance gradient.

The invention also relates to a process for generating images, characterized in that the images are generated on the basis of a modelling of the scene according to the process previously described.

The invention also relates to a process for compressing data defining a 3D scene, these data relating to reference images in respect of rendition and to associated depth maps, characterized in that the depth maps are modelled by facetization according to the process of Claim 4 and in that the data relating to the reference images and to the depth maps are replaced with data defining the facets.

The invention also relates to a process for compressing data defining a 3D scene, these data relating to reference images in respect of rendition and to associated depth maps, characterized in that it comprises the modelling steps according to the modelling process of Claim 3, the elementary regions of the model being defined by a partitioning of the depth maps into image blocks, the calculation on approximate depth maps consisting of a modification of a quantization stepsize for these blocks so as to give a quantized depth which is the approximate depth from which the poorly approximate points of the block are determined.

According to a particular implementation of this process, the modification of the quantization stepsize is carried out in such a way as to obtain the same quantized depth values for a block.

Use of a variable threshold adapted to each pixel and calculated by an auxiliary procedure, makes it possible to control the quality of the synthetic images obtained.

The principle consists in employing a sample representative of the viewpoints which will be synthesized from the model, and in performing the construction of the model while controlling the distortion engendered in the various viewpoints of the sample. More precisely, a maximum fixed value of distortion in the images makes it possible in turn to fix at all points an upper limit on the error of approximating the 3D object by its model. The process thus allows control of the distortion error engendered in the course of rendition.

The present invention proposes in particular a precise definition of the variable threshold when the space of use of the 3D model resulting from the facetization is known, that is to say when the set of viewpoints which may be generated from the model is known, or else when a sample representative of these viewpoints is known. The error of approximation of the depth map created by the facetization procedure for a viewpoint is carried over to the 3D model, and will generally be conveyed by a 2D geometrical distortion in the images for the other viewpoints, synthesized from the model.

The invention allows a simplification of the depth map in such a way as to obtain a less expensive representation, while controlling the loss of quality of the reconstructed images, here the 2D geometrical distortion. The cost of the model is reduced.

BRIEF DESCRIPTION OF THE FIGURES

Other features and advantages of the invention will become clearly apparent in the following description given by way of nonlimiting example, and offered in conjunction with the appended figures which represent:

FIG. 1, a scene in 3D space and its modelling,

FIG. 2, a facetization of "coarse to fine" type,

DETAILED DESCRIPTION OF PREFERRED EMBODIMENTS

Figure 3:
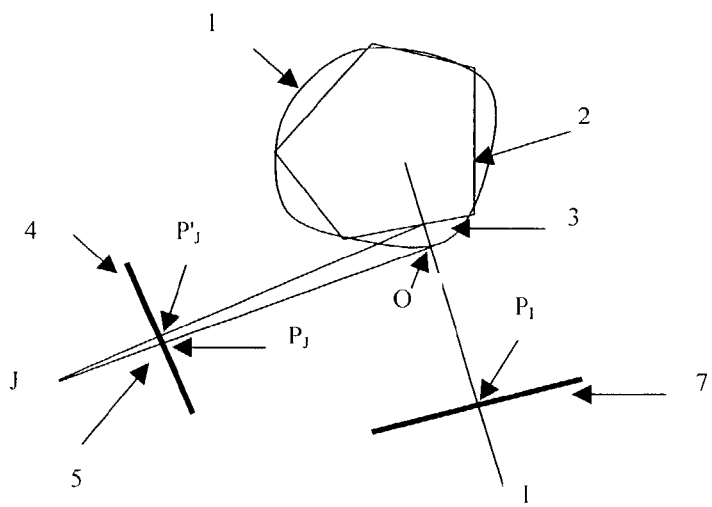
FIG. 3, an error in the synthesized image due to the modelling of an object.

FIG. 3 represents the error in the synthesized image, resulting from the error of approximation of the surface of the 3D object, this approximation corresponding to the facetization of the depth map of the reference image, reference 7. The depth approximation error, referenced 3, is conveyed, for a lateral view from a viewpoint J, by a 2D distortion error referenced 5.

The idea is to take into account this distortion error in a 2D image for known viewpoints J or arbitrarily defined viewpoint. The quantity of these viewpoints must be sufficient to correspond to a representative sample. A maximum error is defined at the level of the 2D image which corresponds to the maximum tolerance of distortion of the image.

The objective is to model the depth map of the reference image 7 while limiting the distortion which this modelling will engender in the images for the viewpoints J. To do this, at all points of the reference image 7 we shall calculate the minimum and maximum values bounding the approximation error and thus ensuring the requisite quality of the images J. At each point of the reference image 7, N pairs of values are calculated, corresponding to the N images J which see this point. Next, the pair of final values of the point is calculated in such a way as to ensure the quality of rendition over the N images J.

For a reference image 7, one thus creates a map of minimum values and a map of maximum values which correspond, for each pixel of the image, to minimum and maximum depths beyond which a 2D distortion greater than the permitted value appears on at least one image from among the set of viewpoints J. It is these thresholds, deviation between the actual 3D depth and these minimum and maximum values, which are utilized to decide on the creation of new facets.

The reference images 7 must be sufficiently numerous to make it possible to characterize the object, for example they should be distributed around the object so as to define its various characteristics, or more generally the scene whatever it may be. The object or the scene are indeed known only by virtue of these reference viewpoints.

Figure 4:
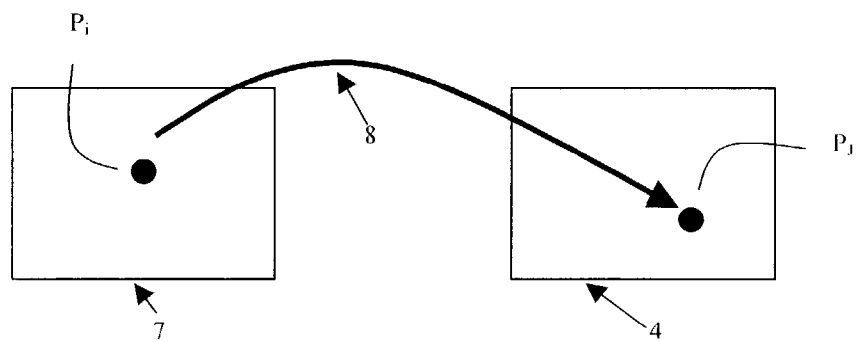
FIG. 4, a perspective projection of a point of a reference image in a synthesized image, FIG. 5, a point projected onto a synthesized image from the actual scene and a point projected from the model, FIG. 6, the epipolar line relating to a projected point, FIGS. 7a and 7b, the approximation of a curve by segments, on the basis of a fixed threshold and of a variable threshold respectively.

FIG. 4 represents the projections $P_J$ and $P_i$ respectively onto the selected images 4 relating to the viewpoints J and the reference images 7 relating to the viewpoints I, of a point O of the object 1. FIG. 4 illustrates the perspective projection 8 of a point of a reference image 7 or image of the representation onto a selected image or rendered image 4. This involves calculating the relation which connects the error in the depth of a point Pi in the representation and the error in the 2D position of the point $P_J$, resulting from the projection of $P_I$ onto an image to be reconstructed.

(u,v) are the coordinates of a point in the image, z is the depth value for this point, hence the distance from the optical centre (I or J) to the object O, the index corresponds to the image regarded as the viewpoint I or J, which image will subsequently be referred to as the image I or image J.

The coordinates of the point $P_J$, $(u_j, v_j, z_j)$ are obtained by perspective projection of the pixel $Pi(u_i, v_i, z_i)$ onto the image J.

The equation can be written in the following form:

$$z_j \cdot \begin{bmatrix} u_j \\ v_j \\ 1 \end{bmatrix} = z_i \cdot \begin{bmatrix} a_{11} & a_{12} & a_{13} \\ a_{21} & a_{22} & a_{23} \\ a_{31} & a_{32} & a_{33} \end{bmatrix} \cdot \begin{bmatrix} u_i \\ v_i \\ 1 \end{bmatrix} + \begin{bmatrix} t_1 \\ t_2 \\ t_3 \end{bmatrix}$$

The coefficients a and t correspond to the mathematical operations relating to the changes of reference frames, rotations, translations, and intrinsic camera parameters for the two viewpoints.

Figure 5:
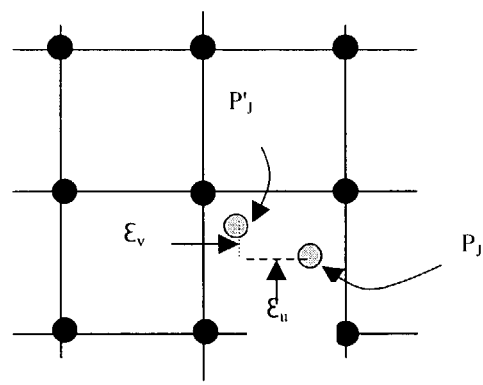

FIG. 5 represents a point $P_J$ in the image J, arising from the projection of a point $P_i$ of the image I. This point does not generally correspond to a pixel of the target image J.

Owing to the approximation of the actual object to the model, that is to say of the depth $z_i$ by $(z_i+\Delta_{zi})$ in the reference image, an error appears in the position of the projected point. $P_J$ with coordinates $(u_j, v_j)$ is the perspective projection based on the actual object and $P'_J$ with coordinates $(u_j+\epsilon_u, v_j+\epsilon_v)$ is the perspective projection based on the model. $z_j$ corresponds to the depth of the point $P_J$ and $z_j+\epsilon_z$ corresponds to the depth of the point $P'_J$.

The relation which exists between an approximation of $z_i$ by $(z_i+\Delta_{zi})$ and the error in the position of the projected point $(u_j+\epsilon_u, v_j+\epsilon_v)$, which corresponds to a distortion of the surface in the rendered image is given by the following equation:

$$(z_j + \varepsilon_z) \cdot \begin{bmatrix} u_j + \varepsilon_u \\ v_j + \varepsilon_v \\ 1 \end{bmatrix} = (z_i + \Delta_{zi}) \cdot \begin{bmatrix} a_{11} & a_{12} & a_{13} \\ a_{21} & a_{22} & a_{23} \\ a_{31} & a_{32} & a_{33} \end{bmatrix} \cdot \begin{bmatrix} u_i \\ v_i \\ 1 \end{bmatrix} + \begin{bmatrix} t_1 \\ t_2 \\ t_3 \end{bmatrix}$$

Considering that a distortion is acceptable if it is not an impediment to the observer, it is possible to define intervals in the values $\epsilon_u$ and $\epsilon_v$ inside which the distortion is acceptable. In their turn, these intervals make it possible to find the acceptable lower and upper limits in $z_i$: $(z_i-\Delta_{zi}^1)$ and $(z_i+\Delta_{zi}^2)$. These values are easily deduced from the above equation.

Figure 6:
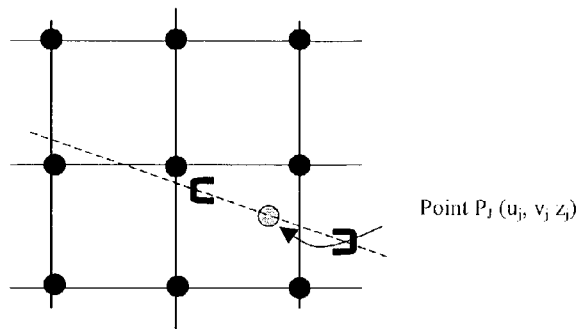

It is known that the 3D projection of points in space onto a first image, which have one and the same point of projection on a second image lie on a straight line of this first image, called the epipolar line. The position of the point of projection on this line depends on the distance from the viewpoint to the second image, that is to say the value $z_i$. This line is shown dashed in FIG. 6.

The tolerated position error for the projected point can for example be that symbolized by the signs [ ] in this figure, where a maximum distance to the projected point is defined. If for example a distortion of less than half a pixel is imposed, these positions correspond to the largest of the values of $\epsilon_u$ and $\epsilon_v$ which is equal to half the interpixel distance, as well as to the corresponding negative value. These 2 limit values define 2 points on the epipolar line, from which the values $z_{min}(i, j)=(z_i-\Delta_{zi}^1)$ and $z_{max}(i, j)=(z_i+\Delta_{zi}^2)$ can be calculated.

Each point Pi of the representation is thus projected onto the images J whose reconstruction it participates in. For a point Pi of the reference image, to each image J there corresponds a point Pj associated with a pair $(z_{min}(i, j), z_{max}(i, j))$. The values $z_{min}(i, j)$ and $z_{max}(i, j)$ are calculated for each of these images J.

Among these values are selected the maximum value $z_M(i)$ among the values $z_{min}(i, j)$ and the minimum value $z_m(i)$ among the values $z_{max}(i, j)$. If the value of $z_i+\Delta_{zi}$ for the point Pi lies in this span $[z_m(i), z_M(i)]$, whatever the image J, then it is possible to deduce therefrom that the distortion, relating to the pixel representative of the point I, over the set of images J is less than the predefined limits, thereby ensuring control of the quality of all the reconstructed images.

In the facetization procedure, the adaptive threshold is employed thus: the approximate depth value $z_{app}(i)$ of each pixel is tested with regard to its membership of the interval $[z_m(i), z_M(i)]$. If all the pixels are such that $z_{app}(i)$ belongs to this interval, the depth map is regarded as "a good approximation", and the facetization scheme is halted. If, on the other hand, there exist pixels whose value $z_{app}(i)$ is outside this interval, then the most poorly approximated point Pi is selected and introduced as facet vertex, and the iterative scheme is continued.

Figure 7A:
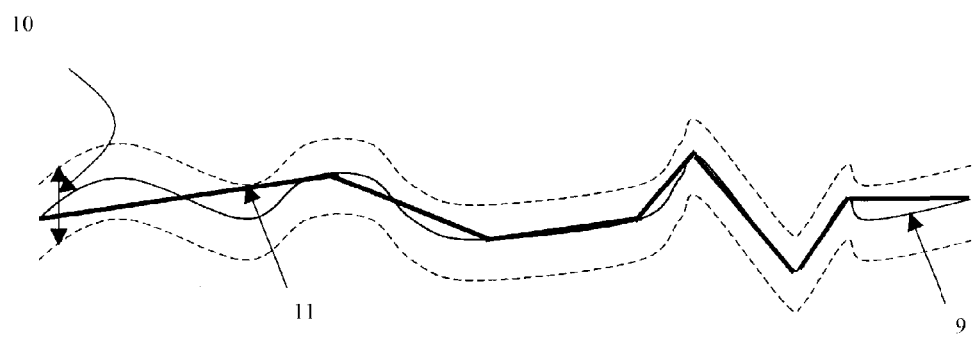
Figure 7B:
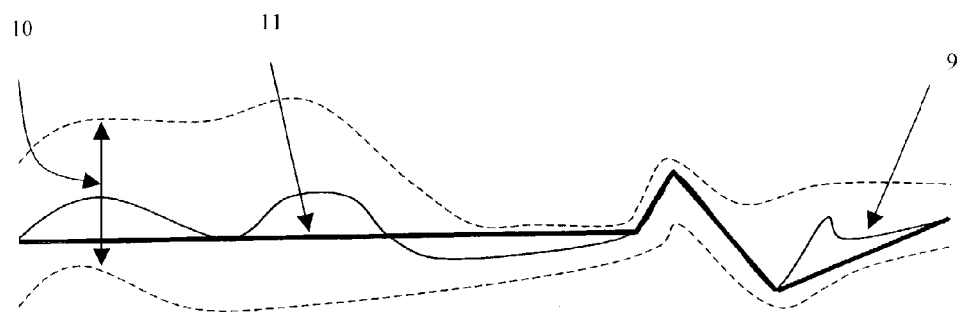

FIGS. 7a and 7b illustrate the principle of approximating a curve by straight line segments with in the first case a fixed threshold, and in the second an adaptive threshold. The curves to be approximated are referenced 9, the intervals or thresholds are referenced 10 and the curves obtained by approximation are referenced 11.

The case of the approximating of a surface by facets can easily be extrapolated from this illustration. The original depth map corresponding to the scene and the approximate depth map corresponding to the model are to be compared respectively with the curve to be approximated 9 and with the straight line segments 11. The spans allocated to the pixels of the depth map correspond to the variable threshold 10.

The 3D model defining the scene is described on the basis of elementary regions, for example facets. An initial depth map is facetized by iterations, as described in FIG. 2 so as to yield an approximate depth map or synthetic depth map.

The iterations are for example carried out in the following manner:

On the basis of an approximate depth map, for each region of this map relating to an elementary region or facet of the 3D scene, the approximate value of each pixel is compared with the span allocated to it. The depth allocated to the pixels of the approximate depth map, calculated in a known manner, for example by interpolation from the depths of the vertices of the facets, is thus compared with the depth of the corresponding pixels of the original depth map, that defining the scene. If the approximate value of a pixel is outside the span, then its corresponding approximation error is calculated. Next, from among these pixels, the one whose error is the largest is selected. A new facetization is then decided for this elementary region. The process is continued thus for the set of regions of the depth map. The iterations on the depth maps are stopped when, for an approximate depth map, the points all have their approximate depths lying inside the spans allocated to these points.

The benefit of an adaptive threshold appears in particular in certain camera motion configurations: for example, when the camera motion is of frontal type, the relief of the zone towards which the camera is directed can be approximated in a coarse manner. Likewise, if the motion corresponds to a rotation, the depth information is no longer useful, the interval is therefore infinite and the representation by facets can be minimal.

The adaptive threshold is defined at each point on the basis of a fixed tolerated maximum distortion error on all the projected points. This distortion can itself be more or less tolerable:

depending on whether the point projected, in a rendered image, lies on the silhouette of the 2D object or inside. It may indeed be important to retain an accurate silhouette although the interior distortions are not for example visible.

depending on whether the point on the image of the representation is situated on a characteristic feature of the object, of geometrical type, for example a rectilinear salient edge, or texturizing edge, whose accuracy it is desired to preserve, or on the contrary in a zone of uniform texture where the defects will be hardly visible.

The distortion permitted may therefore itself vary as a function of such factors. The facetization threshold will then be calculated by taking into account for example, for each point, the maximum distortion value allocated to the pixel closest to the corresponding projected point.

This maximum distortion value can be calculated automatically as a function of parameters defining the image, for example the luminance gradient.

The above-described method of calculating the thresholds comes within the context of the modelling of one or more depth maps, the resulting model being required on the one hand to compress the information and on the other hand to serve to synthesize viewpoints the quality of whose rendition it is desired to control. Within this context, any other mode of modelling involving the approximation of the depth values may also be based on the adaptive threshold for controlling the quality of rendition. Facetization is a means of compressing the data relating to the depth maps. Indeed, the 3D scene is then no longer defined on the basis of depth values allocated to each pixel but on the basis of data defining the facets. Another means, which utilizes spatial correlation, carries out in a conventional manner a partitioning of the image into image blocks, a discrete cosine transformation followed by a quantization of the image blocks. It is for example possible to simplify the content of the blocks before transformation, by for example setting all the points of a block to the same depth value if this approximation complies at all points of the block with the calculated minimum and maximum bounds.

The original depth map is partitioned into image blocks. Each block projected on the object represents the elementary region. The approximation of the depth map to define the model is here performed by quantizing the depth values making up the image blocks. The quantization stepsize is for example chosen to be increasing during the iterations, the error between the quantized image block and the original image block representing the approximation to the model. The span relating to the pixel for which the depth corresponds to the maximum error in the block, is compared with the approximation error to decide on a next iteration.

Figure 8:
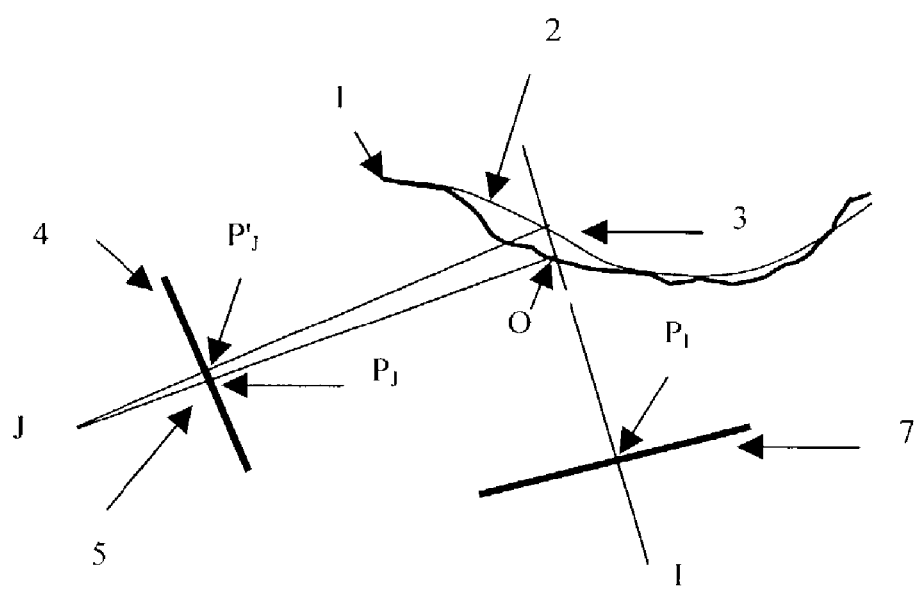
FIG. 8, an error due to the modelling of a scene.

With reference to FIG. 3, FIG. 8 constitutes a generalization of the scene and of the associated model, which is not necessarily limited to a single object and to a faceted model respectively.

The French Patent published under No. 2798761, entitled "procédé de construction d'un modèle de scène 3D par analyse de séquence d'images", [Process for constructing a 3D scene model by analysis of image sequences], the proprietor of which is the applicant, describes the definition of a 3D scene on the basis of masks of images of a sequence of images, which are pixels selected for the construction of the model, and of depth maps. The facetization described previously can be applied to the construction of the model. The 3D representations constructed on the basis of a sequence of images and which are the binary masks describing the 2D regions, the depth maps and positions of the viewpoints then correspond to the reference images. The list of viewpoints which call upon one and the same region in the rendition, that is to say which correspond to the images having pixels in common with one and the same 3D point, or a relevant subset of this list if it is large, is utilized for the calculation of the adaptive threshold.

The invention relates equally to a "coarse to fine" or "fine to coarse" type model construction.

The incremental construction of the model of "coarse to fine" type consists, on the basis of a coarse initial model, in enhancing it by introducing at each iteration a new 3D point of the object to be modelled. During this procedure, it is possible, at each iteration, to test the validity of the model for each of the viewpoints of a reference set, by calculating the maximum distortion in the image, and to introduce a new 3D point if it is greater than the threshold. The procedure is thus halted when all the reference viewpoints have a distortion at all points which is less than the fixed threshold. It is possible for a viewpoint to be no longer taken into account as soon as the distortion in its image is less than the threshold at all points.

The incremental construction of the model of "fine to coarse" type consists, on the basis of the model with maximum resolution, in removing points as long as the quality of the model is acceptable. Within this context, it is also possible, at each iteration, to test the validity of the model for each of the given viewpoints, and to delete a point if the distortion resulting therefrom in each image is below the threshold. The procedure is thus halted when the deletion of a point brings about a distortion greater than the fixed threshold on at least N viewpoints.

The applications of the invention relate inter alia to the construction of models for the synthesization of images or the compression of data.

What is claimed is:

1. Process for modelling a 3D scene (1) defined on the basis of reference images (7) associated with viewpoints (I) and original depth maps, by calculation of approximate depth maps describing a model, comprising the following steps:

predetermining of a maximum permitted distortion (5) on a 2D synthesized image (4), generated by the approximation inherent in the model (2), calculating, for a point I of a reference image (7) and on the basis of a set of synthesized images (4) representing the 3D point of the scene corresponding to this point I, of the minimum $(z_i - \Delta_{zi}^1)$ and maximum $(z_i + \Delta_{zi}^2)$ depth values of a depth $z_i$ of the point I corresponding to the maximum permitted distortion, calculating a span $([z_m(i), z_M(i)])$ around the depth $z_i$ of this point I, dependant on the minimum value of the error $\Delta_{zi}^2$ and on the minimum value of the error $\Delta_{zi}^1$ among the values calculated for the synthesized images of the set, and validating an approximate depth map calculated by iteration, as a function of the approximate depth $z_{app}$ of 3D points of the corresponding model which relate to points I of the reference image, depending on whether it does or does not belong to the span $([z_m(i), z_M(i)])$ calculated for these points I.

2. Process according to claim 1, wherein the calculation of the minimum and maximum values of the depth of a point I, for a synthesized image (4), is performed by utilizing an epipolar line corresponding to the point I in this synthesized image, to which are referred the distances corresponding to the maximum permitted distortion.

3. Process according to claim 1, wherein, the model is defined by a set of elementary regions, and the 3D points whose depth is utilized for the validating step are points of an elementary region of the model.

4. Process according to claim 3, wherein an elementary region is a facet and the calculation by iteration is a facetization of the depth maps, the iteration comprising creation of a new 3D facet vertex of the model or the deletion of a 3D facet vertex of the model depending on whether the process is of the "coarse to fine" or "fine to coarse" type.

5. Process according to claim 4, wherein if the process is of the "coarse to fine" type, the iteration comprises a calculation of the poorest approximate value from among the approximate values which relate to a facet and which are outside the spans, and the new vertex relates to a point corresponding to this value.

6. Process for compressing data defining a 3D scene, these data relating to reference images in respect of rendition and to associated depth maps, wherein the depth maps are modelled by facetization according to the process of claim 4 and the data relating to the reference images and to the depth maps are replaced with data defining the facets.

7. Process for compressing data defining a 3D scene, these data relating to reference images in respect of rendition and to associated depth maps, comprising the modelling steps according to the modelling process of claim 3, the elementary regions of the model being defined by a partitioning of the depth maps into image blocks, the calculation by iterations on an approximate depth map consisting of a modification of a quantization step size for these blocks so as to give a quantized depth which is the approximate depth.

8. Process according to claim 7, wherein the modification of the quantization step size is an increase in the quantization step size to obtain the widest quantization step size or the same quantized depth values for a block.

9. Process according to claim 1, wherein the set of synthesized images (4) on which the calculation of the errors is performed corresponds to a sample representative of the set of viewpoints using the reference image (7).

10. Process according to claim 9, wherein the set of synthesized images on which the calculation of the errors is performed is composed of images having a number greater than a threshold of 3D points in common with the reference image.

11. Process according to claim 1, wherein the maximum permitted distortion is predetermined as a function of a characteristic of an image.

12. Process according to claim 11, wherein a characteristic of an image is the luminance gradient.

13. Process for generating images, wherein the images are generated on the basis of a modelling of the scene according to the process of claim 1.

* * * * *